(12) United States Patent
Chou et al.

(10) Patent No.: US 8,276,188 B2
(45) Date of Patent: Sep. 25, 2012

(54) SYSTEMS AND METHODS FOR MANAGING STORAGE DEVICES

(75) Inventors: Chi-Yang Chou, Kao-hsiung (TW); Pei-Yen Chou, Hsin-chu (TW); Yeu-Chung Lin, Chang-hua (TW)

(73) Assignee: Condel International Technologies Inc., George Town (KY)

( * ) Notice: Subject to any disclaimer, the term of this patent is extended or adjusted under 35 U.S.C. 154(b) by 412 days.

(21) Appl. No.: 12/630,050

(22) Filed: Dec. 3, 2009

(65) Prior Publication Data
US 2011/0138189 A1    Jun. 9, 2011

(51) Int. Cl.
G06F 7/04 (2006.01)
G06F 17/30 (2006.01)
G06K 19/06 (2006.01)

(52) U.S. Cl. .......................... 726/2; 235/492
(58) Field of Classification Search ............... 726/2, 16, 726/20; 235/492
See application file for complete search history.

(56) References Cited

U.S. PATENT DOCUMENTS

| | | | | |
|---|---|---|---|---|
| 6,308,317 B1* | 10/2001 | Wilkinson et al. | | 717/139 |
| 6,575,835 B1* | 6/2003 | Mishina et al. | | 463/42 |
| 6,742,120 B1* | 5/2004 | Markakis et al. | | 713/184 |
| 6,880,084 B1* | 4/2005 | Brittenham et al. | | 713/173 |
| 6,970,891 B1* | 11/2005 | Deo et al. | | 707/824 |
| 7,303,136 B2* | 12/2007 | Tsunoda et al. | | 235/492 |
| 7,353,403 B2* | 4/2008 | Kim | | 713/193 |
| 8,156,322 B2* | 4/2012 | Asnaashari et al. | | 713/150 |
| 8,162,227 B2* | 4/2012 | Asnaashari et al. | | 235/492 |
| 2001/0056536 A1* | 12/2001 | Everett et al. | | 713/172 |
| 2002/0155892 A1* | 10/2002 | Mishina et al. | | 463/42 |
| 2002/0188852 A1* | 12/2002 | Masaki et al. | | 713/182 |
| 2003/0023954 A1* | 1/2003 | Wilkinson et al. | | 717/118 |
| 2003/0233565 A1* | 12/2003 | Kim | | 713/193 |
| 2004/0232247 A1* | 11/2004 | Tsunoda et al. | | 235/492 |
| 2005/0171982 A1* | 8/2005 | Deo et al. | | 707/202 |
| 2005/0171983 A1* | 8/2005 | Deo et al. | | 707/202 |
| 2005/0245995 A1* | 11/2005 | Diebold | | 607/60 |
| 2006/0157571 A1* | 7/2006 | Ciesinger et al. | | 235/492 |
| 2006/0228910 A1* | 10/2006 | Nishizawa et al. | | 439/55 |
| 2006/0289659 A1* | 12/2006 | Mizushima | | 235/492 |
| 2007/0158439 A1* | 7/2007 | Conner et al. | | 235/492 |
| 2008/0051143 A1* | 2/2008 | Chen et al. | | 455/558 |
| 2008/0320187 A1* | 12/2008 | Kim et al. | | 710/100 |
| 2008/0320264 A1* | 12/2008 | Bungert et al. | | 711/164 |
| 2009/0121028 A1* | 5/2009 | Asnaashari et al. | | 235/492 |
| 2009/0121029 A1* | 5/2009 | Asnaashari et al. | | 235/492 |
| 2009/0122989 A1* | 5/2009 | Asnaashari et al. | | 380/278 |
| 2009/0137276 A1* | 5/2009 | Baldischweiler et al. | | 455/558 |
| 2009/0181721 A1* | 7/2009 | Nishizawa et al. | | 455/558 |
| 2009/0323960 A1* | 12/2009 | Chou et al. | | 380/277 |

(Continued)

*Primary Examiner* — Christian Laforgia
(74) *Attorney, Agent, or Firm* — Thomas|Kayden

(57) ABSTRACT

Systems and methods for managing storage devices are provided. The functionalities of smart card and micro SD card are integrated into a storage device to expand the effective storage capacity. The system includes a storage device having a storage area, a microcontroller, and a microprocessor. The microcontroller receives an access request, determines whether the access request conforms to a specific protocol or whether the access request is requesting to activate the microprocessor, and transmits the access request to a microprocessor when the access request conforms to the specific protocol or when the access request is requesting to activate the microprocessor. The microprocessor executes a Card Operating System (COS), and manages the storage area by performing the access request based on the COS. Further, the segmentation of expanded storage space and independent management/security mechanism for segmented spaces also make it possible to perform multi-applications for different card organizations/issuers.

10 Claims, 6 Drawing Sheets

U.S. PATENT DOCUMENTS

2010/0023747 A1* 1/2010 Asnaashari et al. .......... 713/150
2010/0122323 A1* 5/2010 Chou et al. ........................ 726/5
2010/0146279 A1* 6/2010 Lu et al. ........................ 713/172
2010/0243736 A1* 9/2010 Chou et al. .................... 235/385

* cited by examiner

SYSTEMS AND METHODS FOR MANAGING STORAGE DEVICES

BACKGROUND OF THE INVENTION

1. Field of the Invention

The disclosure relates generally to systems and methods for managing storage devices, and, more particularly to systems and methods for managing storage devices, wherein smart card functions are integrated into a storage device, thereby allowing the storage device to provide secure data storage and the smart card can perform multi-application functions.

2. Description of the Related Art

With electronic devices, such as computers or portable devices, being popular, digital data has become a major data recording type for the devices due to increased convenience of digital data. Digital data is always embodied in a data carrier, such as a storage device. The data carrier may vary according to different requirements and applications.

One popular data carrier is a smart card. The smart card is a pocket-sized integrated circuit. The main components of the smart card include a microprocessor and a non-volatile memory, such as an EEPROM. The smart card can receive and process data, and store the processed data in the non-volatile memory of the smart card or output the processed data. The applications for smart cards may be a SIM (Subscriber Identification Module) card for mobile communication services, an ATM card for banking services, a health insurance card, an electronic wallet, and others.

A card reader must be employed to use the smart card. Generally, the card reader is connected to a computer via a USB (Universal Serial Bus) interface. When the smart card is coupled to the card reader, the card reader supplies power to the smart card, so that the smart card can perform operations, such as data input, receiving and processing information for ID authentication, data security management, and others.

Currently, portable devices, such as mobile phones are widely used. In some situations, the smart card is connected to a portable device, such as a mobile phone. In these cases, the portable device must be equipped with the USB interface. However, it is inconvenient for users to simultaneously carry a portable device and a card reader. Further, due to design and manufacturing limitations and cost considerations, the storage capacity of these types of smart cards is limited. The storage capacity of a smart card is normally less than 100 KB, thus hindering application thereof, in a wider range of electronic devices. Therefore, Secure Digital (SD) cards or micro SD cards with high storage capacity, which are widely applied in portable electronic devices, may be used to emulate the functions of smart cards, thereby increasing storage capacity and potential applications Additionally, users must simultaneously carry multiple smart cards since no integration mechanism between smart cards is provided. The integration of smart cards is difficult due to the limited capacity of smart cards and the issue of independent security mechanisms must be controlled by different card organizations/issuers.

BRIEF SUMMARY OF THE INVENTION

Systems and methods for managing storage devices are provided. In some embodiments, storage devices such as Secure Digital (SD)/or micro SD cards are enabled to have secure storage, and smart card functions.

An embodiment of a system for managing storage devices includes a storage device having a storage area, a microcontroller, and a microprocessor. The microcontroller receives an access request, and determines whether the access request conforms to a specific protocol or whether the access request is requesting to activate the microprocessor. When the access request conforms to the specific protocol or when the access request is requesting to activate the microprocessor, the microcontroller transmits the access request to the microprocessor. The microprocessor executes a COS (Card Operating System), and manages the storage area by performing the access request based on the COS.

In an embodiment of a method for managing storage devices, a storage device is provided. The storage device has a storage area, a microcontroller, and a microprocessor. An access request is received by the microcontroller. The microcontroller determines whether the access request conforms to a specific protocol or whether the access request is requesting to activate the microprocessor. When the access request conforms to the specific protocol or when the access request is requesting to activate the microprocessor, the microcontroller transmits the access request to the microprocessor. The microprocessor executes a COS, and manages the storage area by performing the access request based on the COS.

An embodiment of a system for managing storage devices includes a storage device having a storage area, and an integral processing unit. The integral processing unit receives an access request, and determines whether the access request conforms to a specific protocol. When the access request conforms to the specific protocol, the integral processing unit executes a COS, and manages the storage area by performing the access request based on the COS.

In some embodiments, the storage area further has a public area, and the public area comprises a plurality of zones, each corresponding to a card organization and comprising related data for the card organization. When the storage device is connected to an electronic device, the electronic device receives a selection of one of the card organizations, designates one of the zones in response to the selection, and accesses the related data from the designated zone via the microprocessor and/or the microcontroller.

In some embodiments, the storage area further comprises a hidden area comprising a plurality of zones. Each of the zones corresponds to a specific zone in the public area, and comprises a predetermined UID or keys. The predetermined UID is used to authenticate the storage device. The keys are used to encrypt the related data in the corresponding zone in the public area.

Method for managing storage devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Systems and methods for managing storage devices are provided.

Figure 1:
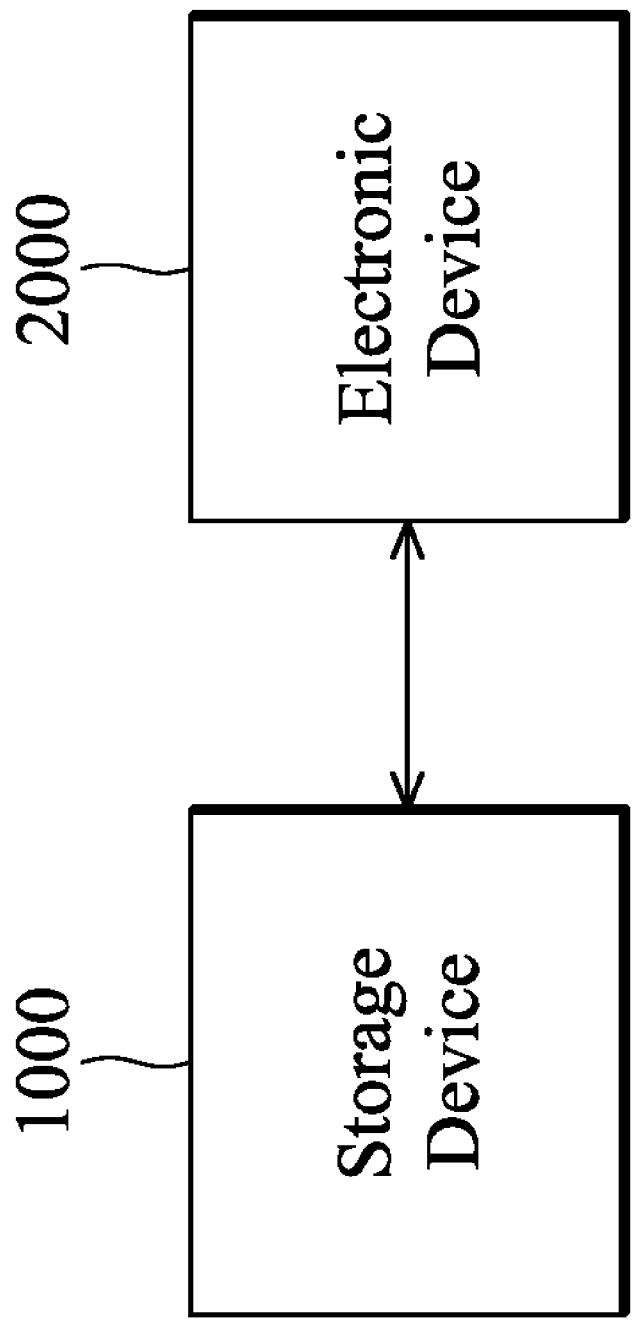
FIG. 1 is a schematic diagram illustrating an embodiment of a system for managing storage devices according to the invention.

FIG. 1 is a schematic diagram illustrating an embodiment of a system for managing storage devices according to the invention.

Figure 2:
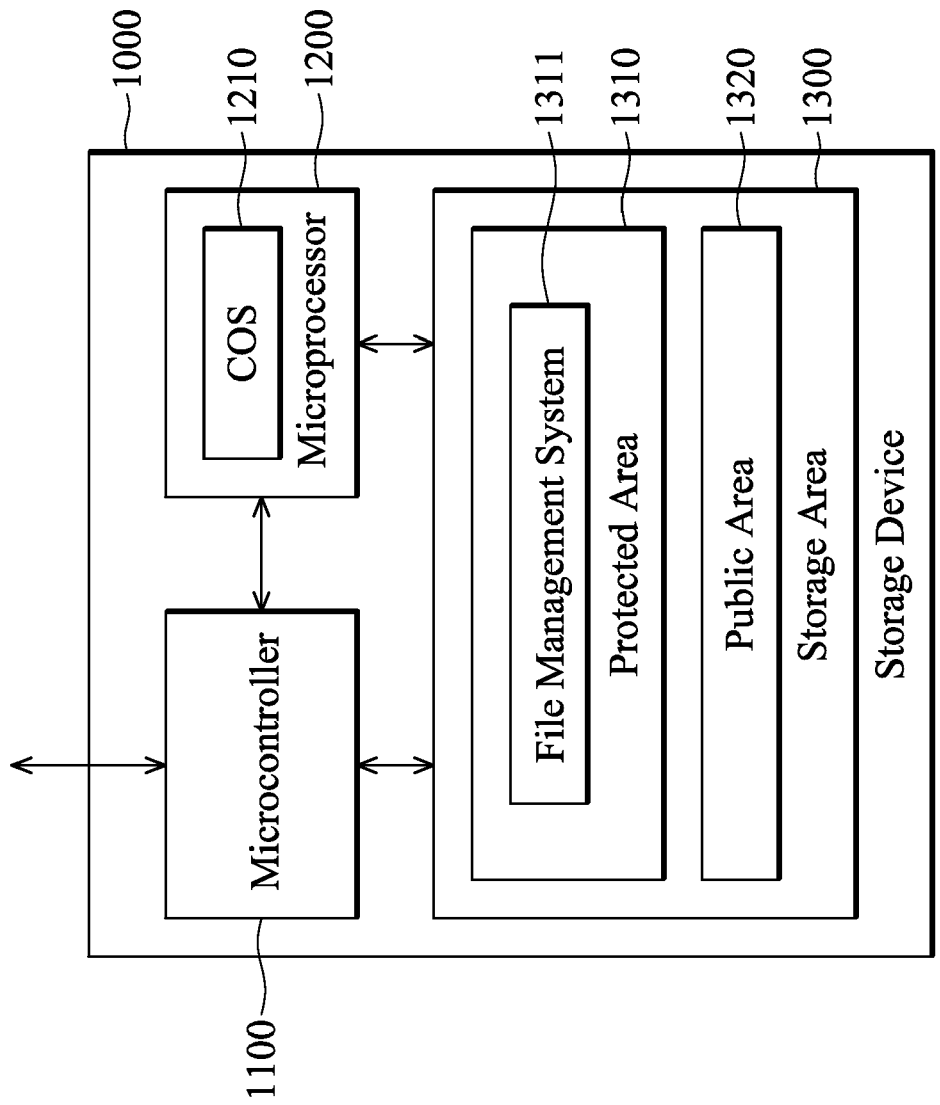
FIG. 2 is a schematic diagram illustrating an embodiment of a storage device according to the invention.

The system for managing storage devices comprises a storage device 1000. The storage device 1000 can be coupled with an electronic device 2000. FIG. 2 is a schematic diagram illustrating an embodiment of a storage device according to the invention. The storage device 1000 may be a memory device, such as an SD/micro SD card. The storage device 1000 comprises a microcontroller 1100, a microprocessor 1200, and a storage area 1300. The microcontroller 1100 may connect to the electronic device 2000 via an interface, such as an SD/micro SD interface (not shown), and receive access requests from the electronic device 2000. In some embodiments, the access requests may conform to a specific protocol, such as the ISO 7816 standard. In some embodiments, the access request may ask to activate the microprocessor 1200. The microprocessor 1200 comprises a Card Operating System (COS) 1210, and performs related operations based on the COS 1210. In some embodiments, the COS comprises instructions for encryption/decryption, interface communication, and/or file management based on the Application Protocol Data Unit (APDU) defined by the ISO 7816 standard. The instructions for encryption/decryption can activate the hardware encryption/decryption functions of the microprocessor 1200. The instructions for interface communication can manage the APDU protocol to be communicated with a card reader. The instructions for file management can manage the file allocation in the storage based on the ISO 7816 standard. In other words, the microprocessor 1200 performs smart card functions based on the COS 1210. The storage area 1300 comprises a protected area 1310 storing at least a file management system 1311. Note that related data in the protected area 1310 can be written once, when the storage device 1000 is manufactured, wherein the data in the protected area 1310 cannot be read and updated by users. The file management system 1311 may be part of a firmware for the microcontroller 1100. It is understood that, in some embodiments, the storage area 1300 may also comprise a public area 1320 for respectively storing applications and data for the microcontroller 1100 and the microprocessor 1200. The microcontroller 1100 can perform SD/micro SD functions, and the method for managing storage devices of the invention by directly executing the file management system 1311 to manage file access in the storage area 1300, or managing file access in the storage area 1300 based on the COS 1210 via the microprocessor 1200, which will be discussed further in the following paragraphs. It is understood that, in FIG. 2, the COS 1210 is stored in a Read Only Memory (ROM) of the microprocessor 1200. However, in some embodiments, the COS 1210 can be stored in the protected area 1310 of the storage area 1300, such that the COS 1210 can be protected at the same protection level of the firmware for the microcontroller 1100.

Figure 3:
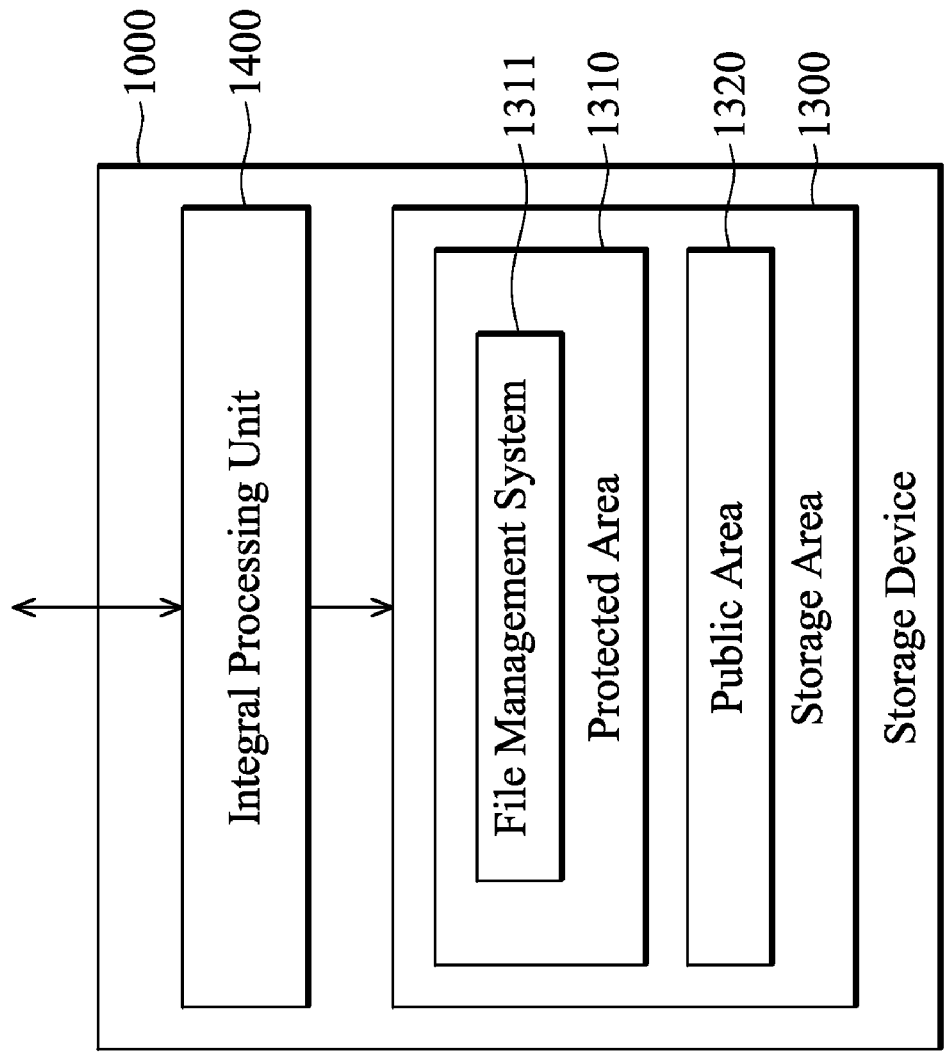
FIG. 3 is a schematic diagram illustrating another embodiment of a storage device according to the invention.

It is understood that, in some embodiments, the microcontroller 1100 and the microprocessor 1200 can be integrated into an integral processing unit 1400, as shown in FIG. 3. The integral processing unit 1400 can perform the method for managing storage devices of the invention, which will be discussed further in the following paragraphs.

Figure 4:
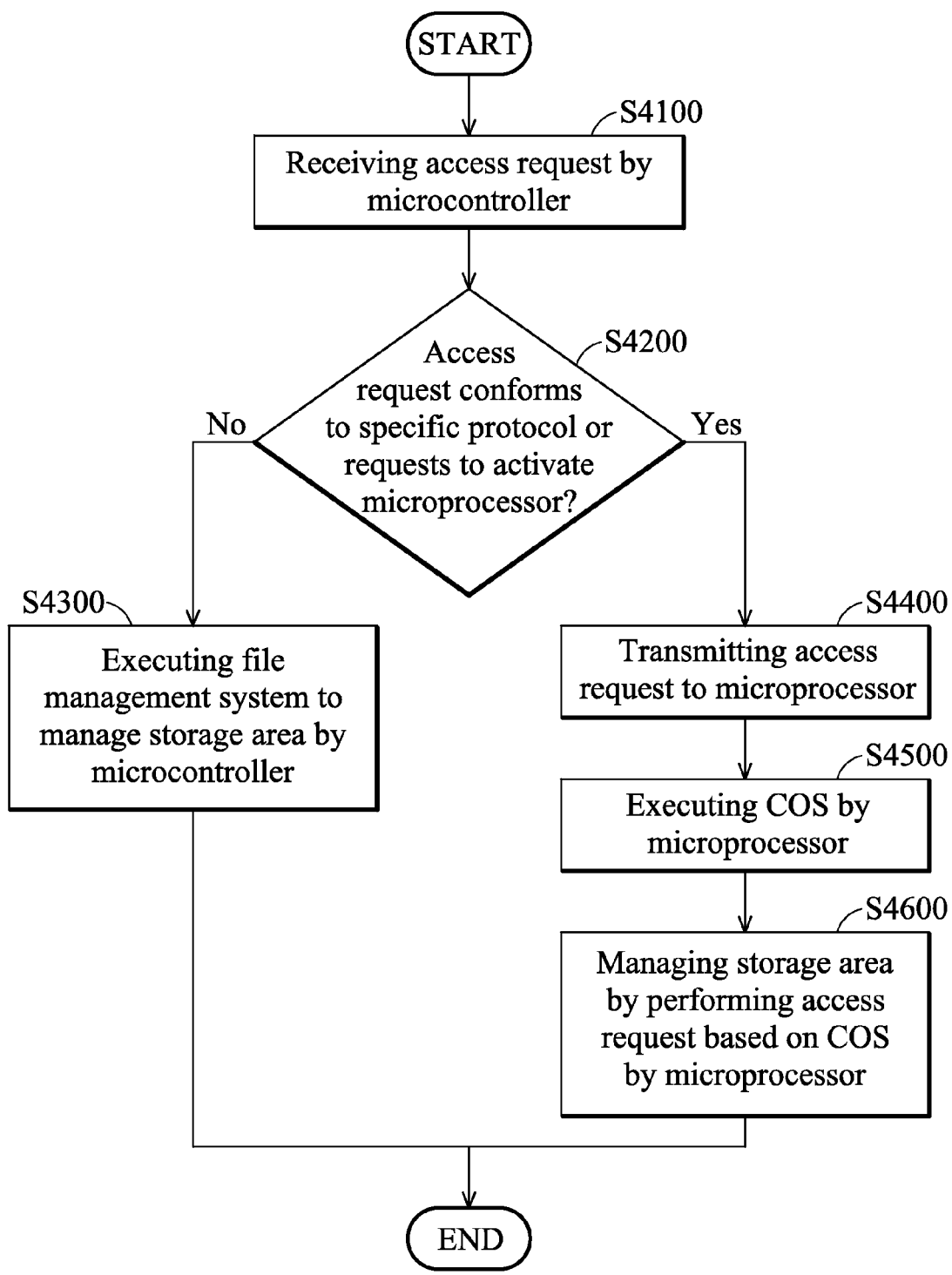
FIG. 4 is a flowchart of an embodiment of a method for managing storage devices according to the invention.

FIG. 4 is a flowchart of an embodiment of a method for managing storage devices according to the invention.

In step S4100, an access request is received by the microcontroller 1100. In step S4200, the microcontroller 1100 determines whether the access request conforms to a specific protocol, such as the ISO 7816 standard or whether the access request is requesting to activate the microprocessor 1200. When the access request does not conform to the specific protocol or the access request does not request to activate the microprocessor 1200 (No in step S4200), in step S4300, the microcontroller 1100 directly executes the file management system 1311 in the protected area 1310 to manage the storage area 1300 of the storage device 1000. It is understood that, a File Allocation Table (FAT) can be stored in the public area 1320 of the storage area 1300. The microcontroller 1100 can manage file access of the storage area 1300 via the file management system 1311 based on the FAT. When the access request conforms to the specific protocol or when the access request is requesting to activate the microprocessor 1200 (Yes in step S4200), in step S4400, the microcontroller 1100 transmits the access request to the microprocessor 1200. In step S4500, the microprocessor 1200 executes the COS 1210, and in step S4600, manages the storage area 1300 by performing the access request based on the COS 1210.

As described, the microcontroller 1100 and the microprocessor 1200 can be integrated into an integral processing unit 1400. When the storage device 1000 has the integral processing unit 1400, the integral processing unit 1400 can receive an access request, and determines whether the access request conforms to the specific protocol, such as the ISO 7816 standard. When the access request conforms to the specific protocol, the integral processing unit 140 executes the COS, and manages the storage area 1300 by performing the access request based on the COS. When the access request does not conform to the specific protocol, the integral processing unit 140 executes the file management system 1311 to manage the storage area 1300.

Figure 5:
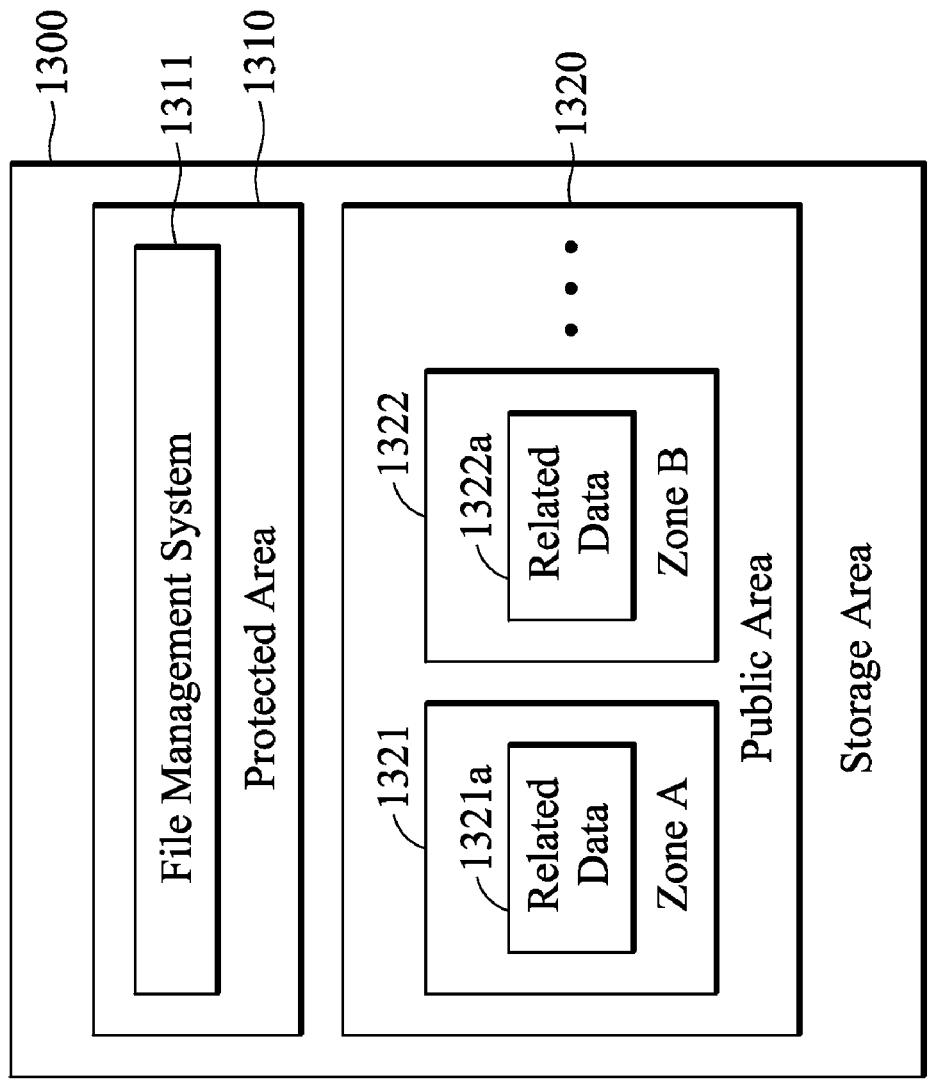
FIG. 5 is a schematic diagram illustrating another embodiment of a storage area in the storage device according to the invention.

In some embodiments, the public area 1320 can comprise a plurality of zones, such as zone A 1321 and zone B 1322, as shown in FIG. 5. It is understood that, in some embodiments, each zone can correspond to a card organization, and may be implemented as a dependent folder. Each zone comprises related data for the card organization. For example, zone A 1321 comprises related data 1321a, and zone B 1322 comprises related data 1322a. In some embodiments, each zone may also comprise an interpretation module (not shown in FIG. 5). The interpretation module can be software or hardware-implemented. The interpretation module can read a Unique Identification (UID) of the storage device 1000, and interpret the UID as a specific UID. Note that, the storage device 1000 may comprise a semiconductor component, such as a memory, wherein the UID is a hardware serial number generated for the semiconductor component when manufactured or a virtual serial number created for the semiconductor component by firmware/software. It is understood that, the interpretation module in different zones may interpret the UID into different specific UIDs based on different mechanisms or algorithms. The mechanism or algorithm for the interpretation module can be determined by a respective card organization. When the storage device 1000 is connected to the electronic device 2000, the electronic device 2000 can receive a selection of one of the card organizations, designate one of the zones in response to the selection, and access the related data, or read and execute the interpretation module from the designated zone via the microprocessor 1200, and accordingly manage the storage device 1000.

Figure 6:
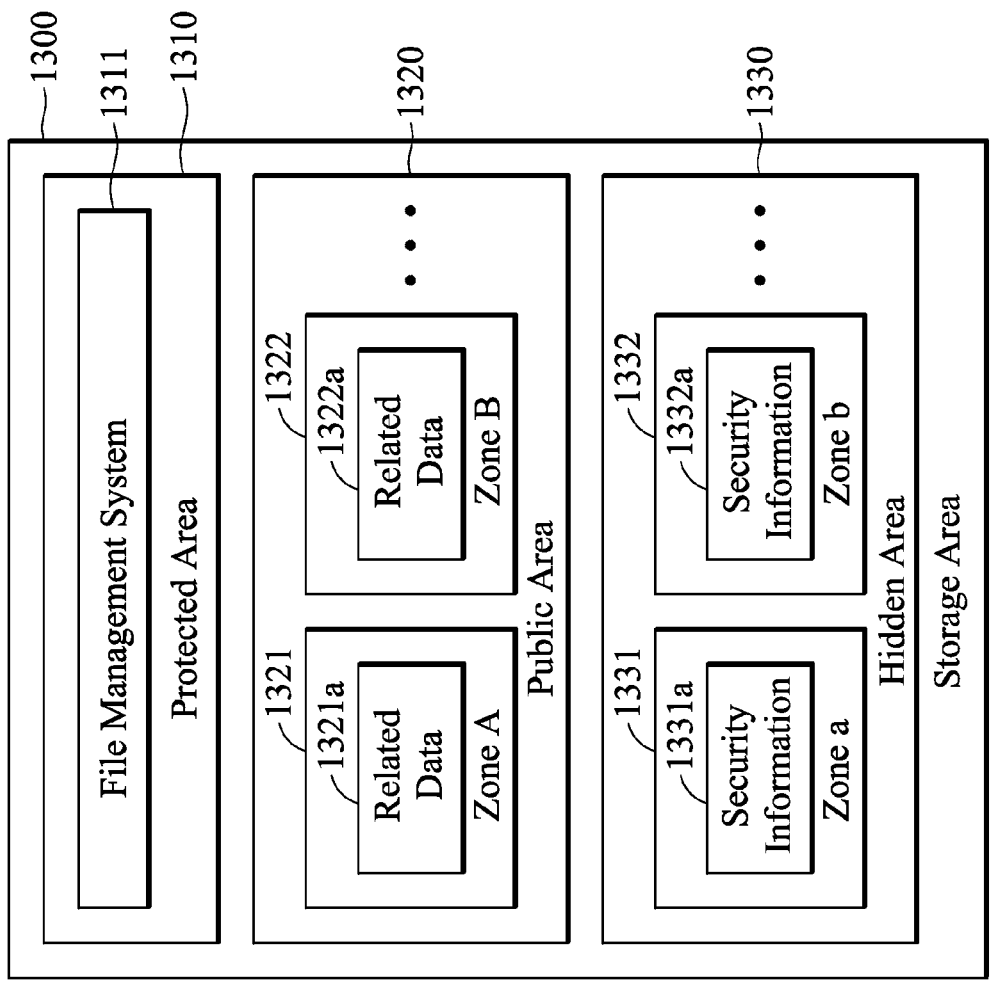
FIG. 6 is a schematic diagram illustrating a further embodiment of a storage area in the storage device according to the invention.

Further, in some embodiments, the storage area 1300 can further comprise a hidden area 1330. The hidden area 1330 can comprise a plurality of zones, such as zone a 1331 and zone b 1332, as shown in FIG. 6. Note that, each zone in the hidden area 1330 may correspond to one of the zones in the public area 1320. For example, zone a 1331 may correspond to zone A 1321, and zone b 1332 may correspond to zone B 1322. Each of the zones may comprise security information. For example, zone a 1331 comprises security information 1331a, and zone b 1332 comprises security information 1332b. In some embodiments, the security information may be a predetermined UID. The predetermined UIDs can be provided by various card organizations, or generated by reading the UID and interpreting using the respective interpretation modules in advance. The predetermined UID can be used to authenticate the storage device. For example, the interpretation module in the designated zone can be executed to read the UID, and interpret the UID as a specific UID. Determination of whether the specific UID conforms to the predetermined UID occurs in the zone corresponding to the designated zone. For the authentication of the storage device 1000 to pass, the specific UID must conform to the predetermined UID. When the specific UID does not conform to the predetermined UID, the authentication of the storage device 1000 is not passed, and a notification for authentication failure is generated. In some embodiments, the security information may be keys. The keys can be used to encrypt or decrypt the related data in the corresponding zone in the public area.

Therefore, the systems and methods for managing storage devices can integrate smart card functions into a storage device, and provide secure storage to the storage device. Due to the segmentation of zone and independent management/security mechanisms for the segmented zones, the storage device integrated functions and data of multiple cards can perform multi-applications for different card organizations/issuers.

Methods for managing storage devices, or certain aspects or portions thereof, may take the form of a program code (i.e., executable instructions) embodied in tangible media, such as flash card or USB disk, wherein, when the program code is loaded into and executed by a machine, such as a computer, the machine thereby becomes an apparatus for practicing the methods.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system for managing storage devices, comprising:
a storage device, comprising:
a storage area;
a microprocessor; and
a microcontroller receiving an access request, determining whether the access request conforms to a specific protocol or whether the access request is requesting to activate the microprocessor, and transmitting the access request to the microprocessor when the access request conforms to the specific protocol or when the access request is requesting to activate the microprocessor,
wherein the microprocessor executes a Card Operating System (COS), and directly manages the storage area without communicating through the microcontroller by performing the access request based on the COS;
wherein the storage area further comprises a public area, and the public area comprises a plurality of zones, each corresponding to a card organization and comprising related data for the card organization, and when the storage device is connected to an electronic device, the electronic device receives a selection of one of the card organizations, designates one of the zones in response to the selection, and accesses the related data from the designated zone via the microprocessor; and
wherein the storage area further comprises a hidden area comprising a plurality of zones, each corresponding to one of the zones in the public area, and comprising a predetermined UID or keys, wherein the predetermined UID is used to authenticate the storage device, and the keys are used to encrypt the related data in the corresponding zone in the public area.

2. The system of claim 1, wherein the storage area further comprises a protected area storing a file management system, and the microcontroller further directly executes the file management system to manage the storage area.

3. The system of claim 2, wherein when the access request does not conform to the specific protocol or when the access request does not request to activate the microprocessor, the microcontroller executes the file management system to manage the storage area.

4. The system of claim 1, wherein the storage area comprises a flash, and the COS is stored in protected area of the flash.

5. The system of claim 1, wherein the storage device connects to an electronic device via a Secure Digital (SD) interface or a micro SD interface to receive the access request from the electronic device.

6. A method for managing storage devices, comprising:
providing a storage device comprising a storage area, a microcontroller, and a microprocessor:
receiving an access request by the microcontroller;
determining whether the access request conforms to a specific protocol or whether the access request is requesting to activate the microprocessor by the microcontroller;
when the access request conforms to the specific protocol or when the access request is requesting to activate the microprocessor, transmitting the access request to the microprocessor by the microcontroller;
executing a COS (Card Operating System) by the microprocessor; and
directly managing the storage area without communicating through the microcontroller by performing the access request based on the COS by the microprocessor;
wherein the storage area further comprises a public area, and the public area comprises a plurality of zones, each corresponding to a card organization and comprising related data for the card organization, and the method further comprises steps of connecting the storage device to an electronic device, receiving a selection of one of the card organizations by the electronic device, designating one of the zones in response to the selection, and accessing the related data from the designated zone via the microprocessor; and
wherein the storage area further comprises a hidden area comprising a plurality of zones, each corresponding to one of the zones in the public area, and comprising a predetermined UID or keys, wherein the predetermined UID is used to authenticate the storage device, and the keys are used to encrypt or decrypt the related data in the corresponding zone in the public area.

7. The method of claim 6, wherein the storage area further comprises a protected area storing a file management system, and the method further comprises a step of directly executing the file management system to manage the storage area by the microcontroller.

8. The method of claim 7, wherein the file management system is executed to manage the storage area by the microcontroller when the access request does not conform to the specific protocol or when the access request does not request to activate the microprocessor.

9. The method of claim 6, wherein the storage area comprises a flash, and the COS is stored in protected area of the flash.

10. The method of claim 6, further comprising connecting the storage device to an electronic device via a Secure Digital (SD) interface or a micro SD interface to receive the access request from the electronic device.

* * * * *